US006396057B1

(12) United States Patent
Jarrell et al.

(10) Patent No.: US 6,396,057 B1
(45) Date of Patent: May 28, 2002

(54) ELECTROSPRAY AND OTHER LC/MS INTERFACES

(75) Inventors: Joseph A. Jarrell, Newtown Highlands; David M. Strand, Sherborn, both of MA (US)

(73) Assignee: Waters Investments Limited

( * ) Notice: Subject to any disclaimer, the term of this patent is extended or adjusted under 35 U.S.C. 154(b) by 0 days.

(21) Appl. No.: 09/655,577

(22) Filed: Sep. 6, 2000

Related U.S. Application Data

(63) Continuation of application No. 09/551,474, filed on Apr. 18, 2000.

(51) Int. Cl.[7] .................... B01D 59/44
(52) U.S. Cl. .................... 250/288
(58) Field of Search .................... 234/102.1, 420; 250/286, 280, 288

(56) References Cited

U.S. PATENT DOCUMENTS 5,015,845 A * 5/1991 Allen et al. .................... 250/288
5,703,359 A * 12/1997 Wampler, III .................... 250/288

* cited by examiner

*Primary Examiner*—Jack Berman
*Assistant Examiner*—Johnnie L Smith, II
(74) *Attorney, Agent, or Firm*—Brian Michaelis

(57) ABSTRACT

An improved method and apparatus for performing Mass spectrometry, in particular, Liquid chromatography/Mass spectrometry (LC/MS) is disclosed. Controlled generation of individual charged droplets enables the subsequent steps of trapping, desolvation and concentration. Miniaturization is also enabled. In contrast, conventional means of forming Electrosprays are chaotic, generating large numbers of charged droplets simultaneously. Additional flows of gas are provided in a nebulization region to effectively remove undesired solvent vapor and concentrate desirable analyte containing droplets and/or analyte ions. A semipermeable structure is used to effectively separate associated gas flow streams. Ions are concentrated or trapped using electrodes which are bound in the nebulization region and are appropriately electrically biased so as to concentrate the ions on one side, or in the center, or in a ring of the laminar gas stream. Additionally, a valve may be used to interrupt the flow gas into a detector region.

5 Claims, 4 Drawing Sheets

ELECTROSPRAY AND OTHER LC/MS INTERFACES

RELATED APPLICATIONS

This application is a continuation of Ser. No. 09/551,474 filed on Apr. 18, 2000.

FIELD OF THE INVENTION

The present invention relates to analytical instruments, and more particularly to Electrospray and Liquid chromatography (LC)/Mass spectrometry (MS) interfaces and the miniaturization of these interfaces.

BACKGROUND OF THE INVENTION

In understanding physical phenomenon, there is often a desire to obtain the molecular weight and structure of a given compound. Mass spectrometry (MS) is a technique that addresses this desire. Using this technique, molecules are weighed by ionizing the molecule itself and measuring the response of the ion, or ions, as they traverse an electric and magnetic field. In the early development of Mass spectrometry, the mechanisms of ionization were electron ionization, chemical ionization and photo-ionization. These methods of ionization were useful for low molecular weight molecules. However, relatively large molecules could not be subjected to Mass spectrometric analysis using these modes of ionization. This left a large gap in the ability to understand, for example, certain biological phenomena. Clearly there existed a need to develop techniques applicable to large molecular weight molecules.

Ionization techniques were improved, such as field desorption, thermospray and Electrospray. These soft ionization techniques produce intact molecular ions that originate from high molecular weight molecules. As a result of this development, applications of Mass spectrometry to biological investigation have become increasingly more frequent. The precise application will often determine which soft ionization technique is to be employed, however, Electrospray is an often used soft ionization technique for producing molecular weight data on large biomolecules.

A liquid flowing through a capillary jet or orifice may be converted into a spray of small charged droplets (on the order of 1 μm in diameter) by applying a strong electric field to the liquid as it emerges from the tip of a capillary. For a sufficiently high applied field, the electrostatic stress imposed by the field and the surface-induced electrical charge is sufficient to overcome the surface tension forces on the liquid. Breaking apart into a large number of small charged droplets is a way for the liquid to disperse the charge and reach a lower total energy state. This process of forming a spray is commonly referred to as Electrospray.

Presently, apparatus are available for forming an Electrospray of a sample solution such as a liquid stream effluent from a Liquid chromatography separation step, and subsequently analyzing the Electrospray with a Mass analyzer such as a quadrupole Mass spectrometer, an ion trap, a time-of-flight Mass spectrometer, or a magnetic sector Mass spectrometer, or the like. Interposed between the apparatus for forming the Electrospray and the analytical apparatus are means for desolvating the droplets forming the Electrospray so as to form a stream of intact ions which are to be analyzed. In a liquid chromatograph, a stream of solvent, containing a mixture of chemical species in solution, is passed at elevated pressure through a chromatographic column. The column is designed so that it separates the mixture by differential retention on the column into its component species. The different species then emerge from the column as distinct bands in the solvent stream, separated in time. Coupling the output of a liquid chromatograph to a Mass spectrometer via an Electrospray interface gives the analyst a powerful tool since it can provide molecular weight and structural information about the separated species as they emerge from the liquid chromatograph.

A variety of Electrospray interfaces are known in the industry, such as those described in U.S. Pat. No. 5,756,994 to Bajic, U.S. Pat. No. 4,977,320 to Chowdhury et al., U.S. Pat. No. 5,015,845 to Allen et al., U.S. Pat. No. 4,999,493 to Allen et al., U.S. Pat. No. 4,531,056 to Labowsky et al., U.S. Pat. No. 5,304,798 to Tomany et al, U.S. Pat. No. 4,861,988 to Henion et al, U.S. Pat. No. 4,209,696 to Fite and UK Pat. No. 1,246,709 to Hazelby et al.

These techniques primarily involve electrostatic nebulization with, or without, pneumatic, thermal, or ultrasonic assistance in forming droplets of a liquid stream containing analyte. These droplets may be generated in a heated or unheated gas stream. The gas serves to desolvate the droplets. The droplets subsequently shrink as they desolvate, resulting in the formation of atmospheric ions of the analyte. These ions and gas and solvent vapors are then sampled into a region of lower pressure where they can be analyzed using Mass spectrometry.

Additionally, interfaces using time modulated Electrosprays are described in U.S. Pat. No. 5,436,446 to Jarrell et al. and U.S. Pat. No. 5,306910 to Jarrell et al. Time modulated Electrosprays form discontinuous bursts of spray that facilitate spray manipulation.

The performance of any interface may be characterized by the efficiency with which sample molecules are ionized, and then the efficiency with which these formed ions are transported into the analyzing means. These prior methods are deficient, however, in that they lack substantial means for the concentration of ions prior to the transfer of these ions into a region of lower pressure entering into the region of low pressure.

The utility of using these soft ionization techniques for coupling the output of a separation to Mass analyzers has been amply demonstrated in the last decade. There is now an additional need to reduce the cost and size of analytical equipment based on these techniques. Miniaturization impacts the utility of these techniques in many ways, improving the cost, reducing the size, improving the reliability and reducing the expense of reagents and concomitantly, the cost of used reagent disposal.

Recently progress has been made in the miniaturization of separation technology. Capillary zone electrophoresis and Liquid chromatography have been implemented on micromachined substrates. Similarly, progress has been made in the miniaturization of Mass analyzers. For example, Ramsey and coworkers have developed a Micro Ion Trap Mass Spectrometer as reported in abstract No. ThPB027 at the 1999 American Society for Mass Spectrometry Conference in Dallas, Tex. In order to enable a fully miniaturized LC/MS or CZE/MS or CEC/MS based system, there is the need for means to miniaturize the interface between the separation techniques and the Mass analyzer. Karger (U.S. Pat. No. 5,872,010) has demonstrated means to miniaturize the generation of the means for forming a conventional Electrospray. While interesting, this has little utility if the goal is to produce a fully miniaturized analytical instrument.

Hence there is a need for methods and apparatus to miniaturize a complete interface.

SUMMARY OF THE INVENTION

The present invention provides improved methods and apparatus for coupling the output from liquid phase separation techniques to Mass spectrometry, in particular, Liquid chromatography/Mass spectrometry (LC/MS). Further, these methods and apparatus are capable of being miniaturized.

According to an illustrative embodiment, the charged droplets (from which ions are formed) are produced in a controlled manner, one at a time or "on demand". The droplets are formed by mechanical means. A voltage is used to charge the droplets, but unlike conventional Electrospray, the voltage supplied is insufficient to directly cause the formation of an Electrospray. This is in contrast to prior art techniques where the droplets are produced in large numbers with very little control. Controlling the means of droplet generation, increases the efficiency with which subsequent necessary steps can occur. This increased efficiency, enables a further embodiment in which the structures necessary for a complete interface can be reduced in scale sufficiently to enable their construction using various micromachining techniques.

The subsequent steps of desolvation, ion generation, ion concentration, introduction of said formed ions into a lower pressure (vacuum) region that embody a complete interface can be distributed in space or in time. Prior art has focussed on processes that are distributed in space as these are more easily optimized for ion streams that are essentially continuous. The controlled production of single droplets, however, makes feasible the effective distribution of these processes in time. Additionally, this controlled production of droplets and hence ions enables effective means for concentrating these droplets and/or ions prior to the transfer of these ions into a region of lower pressure.

According to a further embodiment of the invention, additional flows of gas are provided in a nebulization region to effectively remove undesired solvent vapor and concentrate desirable analyte containing droplets and/or analyte ions. A porous structure is used to effectively separate associated gas flow streams. Ions are concentrated using electrodes which are appropriately electrically biased and driven with DC and RF voltages so as to concentrate the ions in a laminar gas stream. Additionally, tapered wedges or skimmers are positioned so as to peel away the portion of the gas stream that contains, for example, a majority of the ions.

A significant advantage that is derived from the current invention is an increased efficiency with respect to ion formation and transportation.

BRIEF DESCRIPTION OF THE DRAWINGS

These and other features of the present invention will be better understood in view of the following detailed description taken in conjunction with the drawings, in which.

DETAILED DESCRIPTION

Figure 1A:
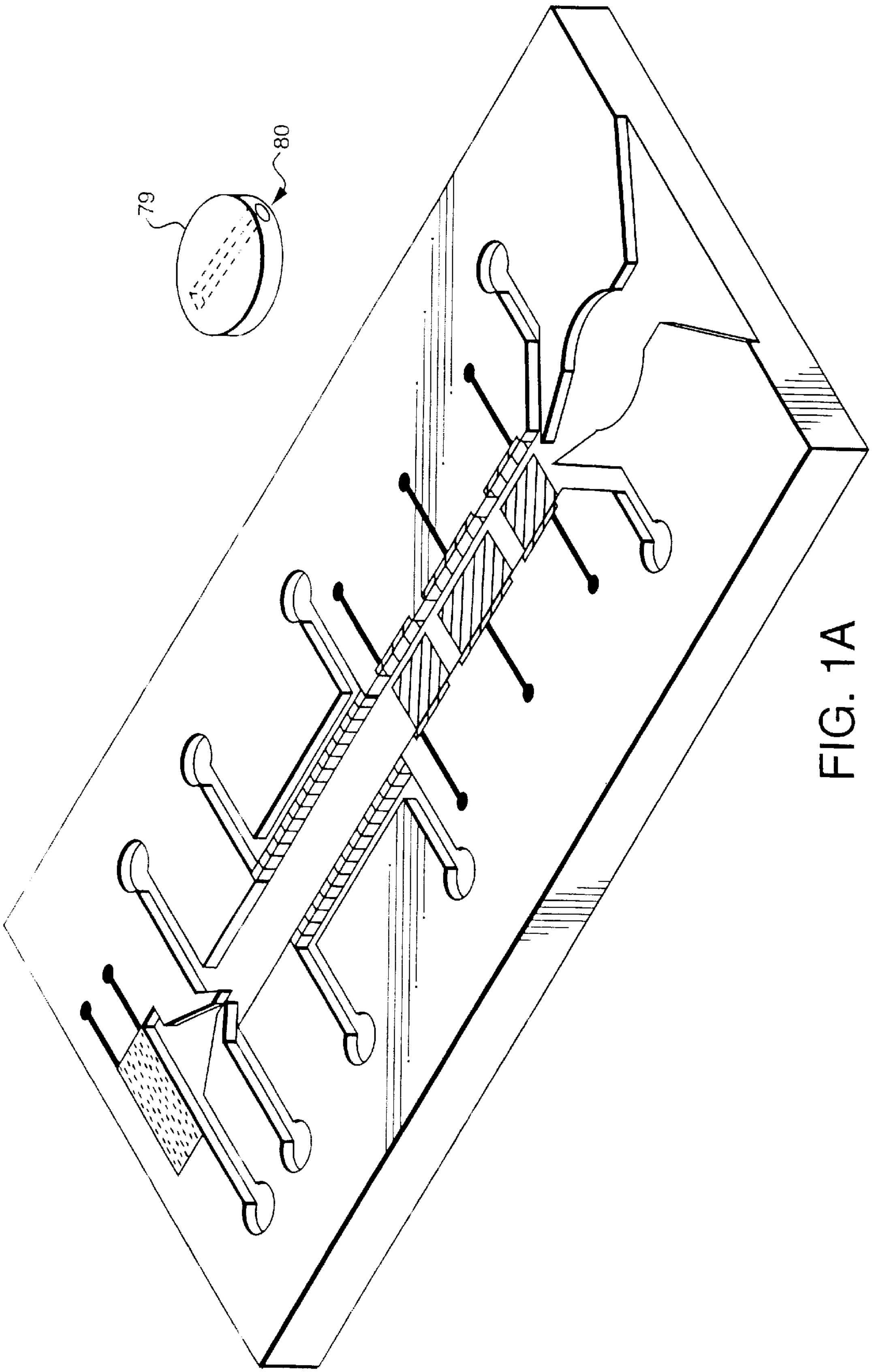
FIGS. 1*a* and 1*b* are perspective views of two parts of an illustrative embodiment showing, in FIG. 1*a*, a microscale base portion and, in FIG. 1*b*, a corresponding lid portion.
Figure 1B:
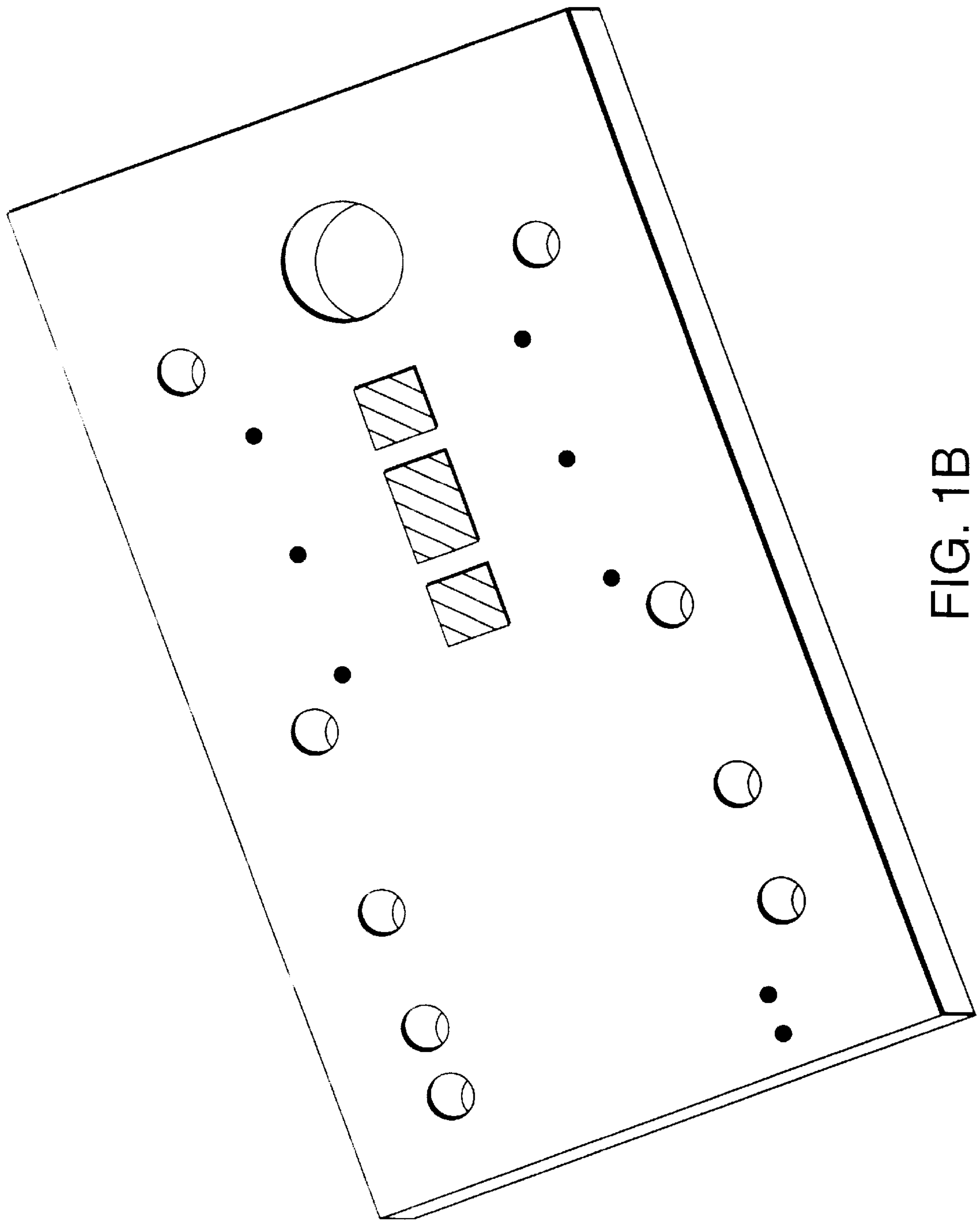

The present invention pertains to improved methods and apparatus for interfacing a liquid stream, typically emerging from a liquid separations device, to a Mass spectrometer. In an illustrative embodiment, the interface comprises a base 1 and a lid 2. The lid 2 has through holes 3, 4, 5, 6, 10, 8 , 9, 7 and 12. The base 1 has a corresponding set of shallow holes (not through holes) 34, 37, 38, 50, 78, 41, 43, 48 and 76 which connect to a corresponding set of fluid carrying channels 35, 39, 44, 40, 51, 77, 42, 49 and 75. When lid 2 is placed on top of base 1 and the two portions are bonded together, fluid connections may be made to the upper surface of lid 2 through the through holes. The dimensions of the holes and channels are such that they can be conveniently be made by the collection of techniques known as micromachining as, for example, are described in U.S. Pat. No. 5,872,010 to Karger et al. Lid 2 and base 1 may be made from a variety of materials including, but not limited too, silicon, plastic, metals, or glass. They may be made of dissimilar materials. Details of construction may vary according to the materials chosen, but the fundamental topologies illustrated here remain the same.

Similarly, electrically conductive elements 13, 14, 15, 16, 17, 18, 19 and 20 pass through lid 2. In the event that the material of construction of lid 2 is electrically conductive, then additional electrically insulating sheaths (not shown) must of course surround elements 13, 14, 15, 16, 17, 18, 19 and 20 so as to insulate them from the lid. Corresponding electrical conductors 31, 32, 52, 53, 54, 61, 62 and 63 make contact with elements 13, 14, 15, 16, 17, 18, 19 and 20 when lid 2 is bonded with base 1 such that external electrical signals may be applied to piezoelectric element 33, and to electrically conductive elements 64, 65, 66, 21, 67, 68, 69, 22, 70, 71, 72 and 23. Electrically conductive elements 64, 65, 66, 21, 67, 68, 69, 22, 70, 71, 72, 21, 22 and 23 may be formed by a variety of means including metallization by electrodeposition, sputtering ore evaporation, or by doping of otherwise nonconducting material. Barium titanate is an example of an appropriate material for element 33. Gold, aluminum and platinum are examples of appropriate materials for any electrically conductive elements.

The means for applying electrical signals to elements 21, 22, 23, 65, 68 and 71 are not shown. This may be done in a manner similar to that by which electrical signals are applied to elements 64, 67, 70, 66, 69 and 72.

Element 79 is a rotatable valve stem comprising a passageway 80 through it. Element 11 is not a through hole but rather a hole of shallow depth whose purpose is to provide bearing support for the rotary motion of valve stem 79. Valve stem 79 may be actuated by a variety of means including mechanical, magnetic, electrostatic and other means known to one skilled in the art. Element 79 may be constructed of silicon, plastic, glass, or metal. The appropriate choice of material will depend on the choice of said actuating means.

A liquid sample for analysis is introduced through holes 3 and 34 so that it can then pass through channel 35 to the droplet generator comprised of orifice 36 and electrically driven piezoelectric element 33. Such droplet generation techniques are well known. Element 33 is driven by electrical voltages applied to conducting elements 13 and 14 which are in contact with electrical conductors 31 and 32 which contact opposite faces of piezoelectric element 33. Applying a rapid change in voltage across 13 and 14 thus applies this voltage across the faces of 33 which generates a mechanical stress which causes fluid in channel 35 to be ejected as a droplet from orifice 36 into space 47. In this embodiment, space 47 is a simply a portion of a larger micromachined channel 49 that essentially passes the length of base 1. A charge may be applied to the droplet by a variety of techniques. In this illustrative embodiment, a voltage may be applied via a suitable electrode to the liquid stream entering hole 3. Alternative means of generating equivalent mechanical stress such as thermal means such are used by the Hewlett-Packard company in their inkjet printers are known and could be used instead of the piezoelectric means described here. Dry gas such as nitrogen, argon, or helium (others may be used) can be introduced through holes 4, 9, 37 and 41 and channels 39 and 42 such that this gas flows into region 47 so as to entrain the droplet through volume 47 and commence the desolvation of the droplet. The droplet moves through volume 47 towards exit 81 by virtue of any velocity imparted to it during its generation and by the gas flow emanating from channels 42 and 39. If necessary, the polarity of the potential applied to the liquid stream may be momentarily reversed such as to generate a retarding electrical field which can be used to slow the motion of the droplet. To aid in the desolvation of the droplet, the walls 45 and 46 of volume 47 are made from a semipermeable or porous material. Typically, this might be porous silicon, but other materials or semipermeable structures are possible. Additional flows of dry gas are introduced through holes 6 and 7 such that the gas travels through channels 44 and 40 flowing from holes 6 and 7 towards, and exiting, holes 5 and 8. This flow of gas is countercurrent to the direction of travel of the droplet and as such, in combination with the porous structures 45 and 46, will optimally assist the desolvation of the droplet during its passage through volume 47. As the droplet is desolvated, it shrinks and the electrical stress on the droplet surface increases resulting in the formation of ions by the same processes that occur in conventional Electrospray. Cocurrent flow of desolvating gas can also be used but with less optimal results.

After exiting region 47, the droplet passes into region 51 which comprises electrically conductive elements 64, 65, 66, 21, 67, 68, 69, 22, 70, 71, 72 and 23. By virtue of their geometric arrangement, these elements can be used to apply DC and RF electric fields to droplets or ions in region 51. A wide variety of means of generating the time and spatial dependence of these fields exist and are described in the patent and scientific literature. This includes those known by the acronyms SWIFT, described in U.S. Pat. No. 4,761,545 to Marshall et al, and Filtered Noise Fields, described in U.S. Pat. No. 5,206,507 to Kelley. These techniques are well-known to those versed in the art and are described, for example, in the books "Practical Aspects of Ion Trap Mass Spectrometry, Volumes I, II and III.", edited by R. E. March and J. F. J. Todd, CRC Press 1995. In this embodiment, RF fields will generally be applied to contain and focus the droplet near the central axis of channel 49 and DC voltages will be sequentially and repetitively switched in time so as to temporarily trap droplets and ions in, and then release from, that portion of channel 49 bounded by elements 67, 68, 69 and 22. This switching is optimally phased synchronously with the droplet generation such that each droplet is optimally desolvated and the ions generated from each droplet are optimally concentrated in the gas phase prior to their introduction into the lower pressure region 81 that is coupled to the Mass analyzer vacuum system.

During the trapping phase, the droplets in this region can be further desolvated, causing further ion generation. The applied electric field retains the droplet and ions while the gas flowing from region 47 through region 51 and exiting via channels 75 and 77 will carry the evaporated solvent vapor. Furthermore the concentration of ions increases during this trapping phase.

Figure 2:
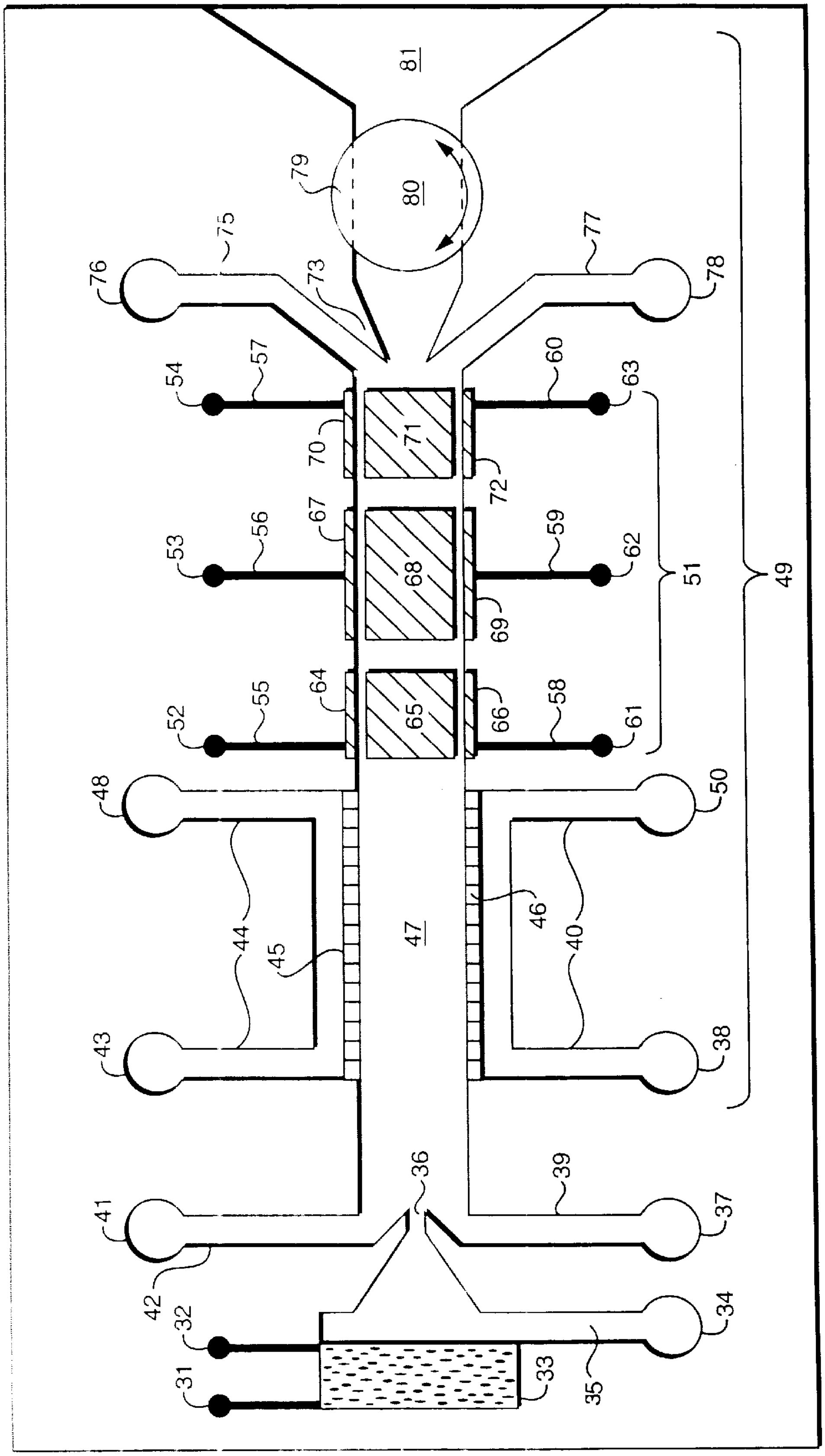
FIG. 2 is a schematic view of the upper mating face of the base portion.
Figure 3:
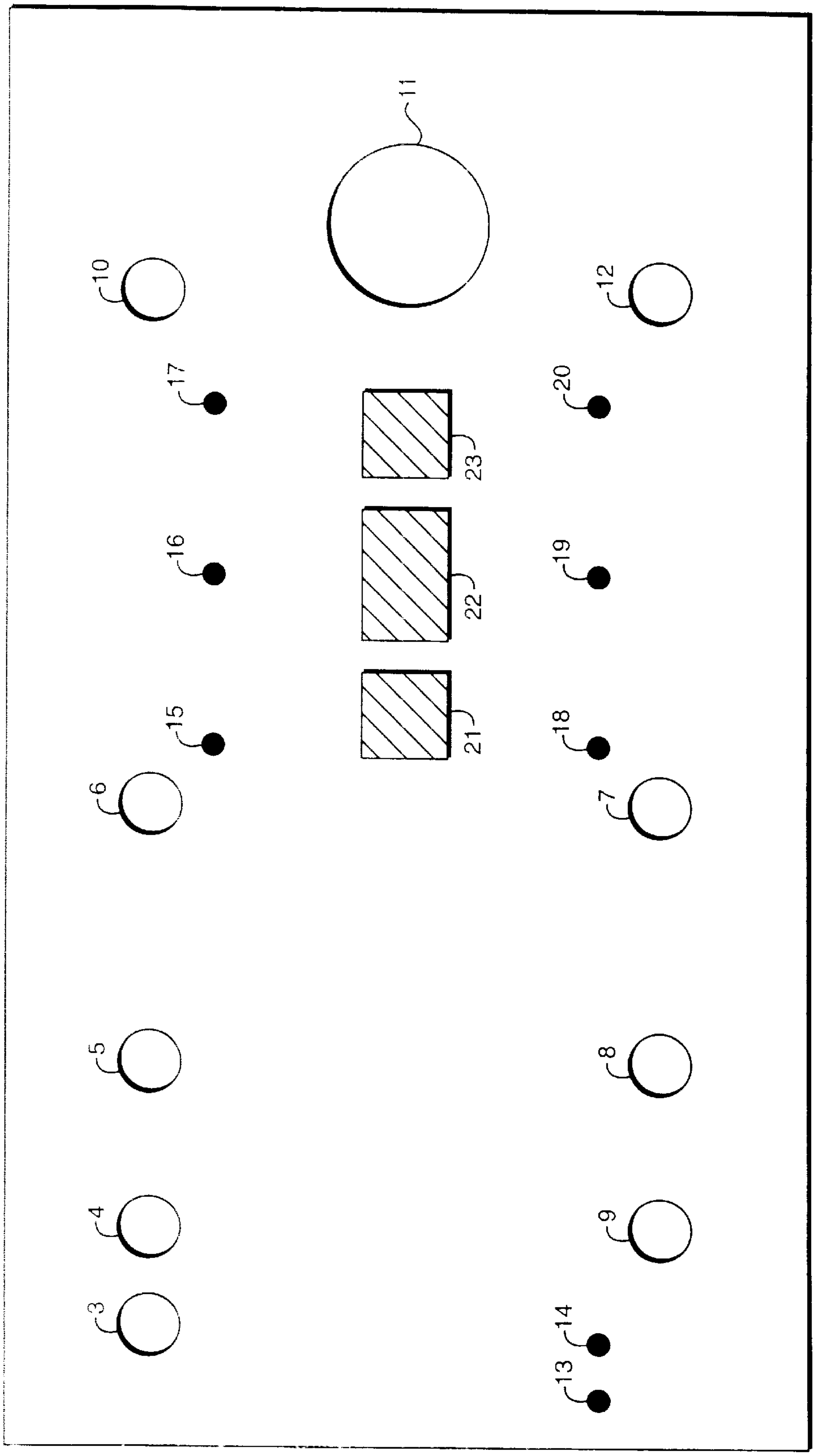
FIG. 3 is a schematic view of the underside mating face of the lid portion.

When valve stem portion 79 is in the open position shown in FIG. 2, lower pressure region 81 communicates with region 51 via orifice 74 and passageway 80. Gas and ions can then flow into region 81 and on to the Mass analyzer. When valve stem portion 79 is rotated 90 degrees from the position shown in FIG. 2 and hence closed, gas and ions do not flow into region 81. In this situation, all gas flow must exit via channels 75 and 77. The walls of channels 75 and 77 that for contain orifice 74 can be contoured so that the edges of orifice 74 are knife-like thus forming a skimmer means as originally described by Kantrowitz (A. Kantrowitz and J. Grey, "A high intensity source for the molecular beam. Part I. Theoretical". Rev. Sci, Instrum., 22, 5 (1951) p. 328–332.). Such means are well known to those skilled in the art.

Synchronously phasing the opening of valve stem 79 to substantially coincide with the electrical release of ions from region 51, increases the number of ions introduced into region 81 per unit volume of gas flow.

In summary, it is the controlled generation of individual or small numbers of, charged droplets that enables the subsequent steps of trapping, desolvation and concentration. Miniaturization is also enabled. In contrast, conventional means of forming Electrosprays are chaotic, generating large numbers of charged droplets simultaneously. This causes mutual repulsion of droplets leading the droplets and ions formed to spread out in space. Additionally, when large numbers of droplets are generated, effective desolvation is inhibited, because the solvent vapor released from one droplet, reduces the rate of evaporation of solvent from adjacent droplets.

It will be evident to those skilled in the art that various attributes of this invention may be advantageously applied to other sample introduction means for Mass spectrometry such as particle beam Mass spectrometry using glow discharge as a means of ion generation. Further, it will be evident to those skilled in the art that it can be advantageous to add baffles or barriers in order to obstruct the transmission of neutral particles and clusters that can result in background noise. Additionally, it will be evident to those skilled in the art that with an appropriate material it can be advantageous, to combine the functions of regions 47 and 51. Further, it will be evident to those skilled in the art that while the controlled generation of single droplets is an essentially part of the illustrative embodiment, other aspects of this inventions, such as the use of electrostatic trapping and valving increase the efficiency of ion transport into the Mass analyzer, can be applied with positive results to conventionally sized interfaces that use conventional or pulsed Electrosprays.

Further, it will be evident to those skilled in the art that it will be possible to construct arrays of this invention on one substrate. It will also be evident that the addition of an extra electrode or a radioactive source will enable the use of the related interface techniques of atmospheric pressure chemical ionization techniques such as are described in by Carroll et al in "Atmospheric Pressure Ionization Mass Spectrometry", Applied Spectroscopy Reviews, 17(3) 337–406 (1981). Finally, it is evident that alternative means, including non-rotating means may be used to interrupt the flow of gas into the low pressure region 81.

Although the invention is shown and described with respect to an illustrative embodiment thereof, it should be appreciated that the foregoing and various other changes, omissions and additions in the form and detail thereof could be implemented without changing the underlying invention.

What is claimed is:

1. An apparatus for converting a liquid effluent comprising a sample solute and solvent into ions of said sample solute molecules for analysis of sample solute by a Mass spectrometer, comprising:

a nebulization region, wherein an individual charged droplet may be controllably generated;

a desolvation region for desolvating said droplet and promoting formation of said ions; and a detector region, wherein a detector detects the Mass of ions entering said detector region from said desolvation region.

2. The apparatus of claim 1, further comprising a trapping region with means for generating electric fields for trapping and concentrating said ions or droplet.

3. The apparatus of claim 1, further comprising means to interrupt gas flow entering into said detector region.

4. The apparatus of claim 1 wherein said desolvation region comprises one or more semipermeable structures which are used to effectively separate associated gas flow streams.

5. An apparatus for converting a liquid effluent comprising a sample solute and solvent into ions of said sample solute molecules for analysis of sample solute by a Mass spectrometer, comprising:

a nebulization region, wherein an individual charged droplet may be controllably generated;

a desolvation region for desolvating said droplet and promoting formation of said ions, comprising a semipermeable walls and adjacent to other channels through which additional flows of gas assist in the desolvation process;

a detector region, wherein a detector detects the Mass of ions entering said detector region from said desolvation region; and a means to interrupt gas flow entering into said detector region.

* * * * *